US012566322B2

(12) United States Patent
Hudman et al.

(10) Patent No.: US 12,566,322 B2
(45) Date of Patent: *Mar. 3, 2026

(54) COMPACT OPTICS FOR HEAD-MOUNTED DISPLAY SYSTEMS

(71) Applicant: Valve Corporation, Bellevue, WA (US)

(72) Inventors: Joshua Mark Hudman, Issaquah, WA (US); Kameron Wade Rausch, Sammamish, WA (US)

(73) Assignee: Valve Corporation, Bellevue, WA (US)

( * ) Notice: Subject to any disclaimer, the term of this patent is extended or adjusted under 35 U.S.C. 154(b) by 306 days.

This patent is subject to a terminal disclaimer.

(21) Appl. No.: 18/066,184

(22) Filed: Dec. 14, 2022

(65) Prior Publication Data

US 2023/0236396 A1 Jul. 27, 2023

Related U.S. Application Data

(60) Provisional application No. 63/301,923, filed on Jan. 21, 2022.

(51) Int. Cl.
　　*G02B 17/08* (2006.01)
　　*G02B 1/00* (2006.01)
　　　　　　(Continued)

(52) U.S. Cl.
　　CPC ............. *G02B 17/08* (2013.01); *G02B 1/002* (2013.01); *G02B 5/1876* (2013.01);
　　　　　　(Continued)

(58) Field of Classification Search
　　CPC ............ G02B 27/0101; G02B 27/0103; G02B 27/0172; G02B 27/1006; G02B 27/102; G02B 27/1026; G02B 27/103; G02B 27/104; G02B 27/1046; G02B 27/1053; G02B 27/1086; G02B 27/1093; G02B 27/283; G02B 27/4205; G02B 27/4244;
　　　　　　(Continued)

(56) References Cited

U.S. PATENT DOCUMENTS 10,495,798 B1 * 12/2019 Peng ...................... G02B 27/01
10,634,907 B1 * 4/2020 Geng ................... G02B 27/283
　　　　　　(Continued)

FOREIGN PATENT DOCUMENTS

WO　　WO 2019062480 A1　　4/2019

OTHER PUBLICATIONS

International Search Report and Written Opinion, mailed Mar. 27, 2023, for International Patent Application No. PCT/US22/81588. (10 pages).

*Primary Examiner* — Nicholas R. Pasko
(74) *Attorney, Agent, or Firm* — Seed Intellectual Property Law Group LLP

(57) ABSTRACT

An optical system of a head-mounted display (HMD) system that includes a diffractive optical element coupled to a display, for example, via lamination or a suitable optically clear adhesive. The optical system may include a reflective polarizer and a quarter-wave plate that, together with the diffractive optical element, form a catadioptric or "pancake" configuration that focuses light from a display system to an eye of a user of the head mounted display system.

19 Claims, 5 Drawing Sheets

(51) Int. Cl.

| | |
|---|---|
| *G02B 5/18* | (2006.01) |
| *G02B 27/01* | (2006.01) |
| *G02B 27/28* | (2006.01) |
| *G02B 27/42* | (2006.01) |
| *G06F 1/16* | (2006.01) |

(52) U.S. Cl.
CPC ....... *G02B 27/0172* (2013.01); *G02B 27/283* (2013.01); *G02B 27/4205* (2013.01); *G06F 1/163* (2013.01); *G02B 2027/0123* (2013.01); *G02B 2027/0127* (2013.01)

(58) Field of Classification Search
CPC .... G02B 17/08–086; G02B 2027/0105; G02B 2027/0107; G02B 2027/0123; G02B 2027/0127; G02B 2027/0174
See application file for complete search history.

(56) References Cited

U.S. PATENT DOCUMENTS

| | | | | |
|---|---|---|---|---|
| 11,740,464 | B2 * | 8/2023 | Hudman | G02B 6/005 |
| | | | | 359/489.07 |
| 12,013,541 | B2 * | 6/2024 | Hudman | G02B 6/0023 |
| 2015/0177591 | A1 * | 6/2015 | Sugiyama | G02B 27/0093 |
| | | | | 359/298 |
| 2016/0033698 | A1 | 2/2016 | Escuti et al. | |
| 2016/0313556 | A1 | 10/2016 | Futterer | |
| 2017/0160547 | A1 * | 6/2017 | Webster | G02B 27/4205 |
| 2017/0248790 | A1 * | 8/2017 | Cheng | G02B 6/0076 |
| 2018/0039052 | A1 * | 2/2018 | Khan | G02B 17/0856 |
| 2019/0243147 | A1 * | 8/2019 | Smithwick | G02B 27/0103 |
| 2019/0302466 | A1 * | 10/2019 | Koshihara | G02B 27/0972 |
| 2019/0353906 | A1 * | 11/2019 | Gollier | G02B 27/144 |
| 2020/0166754 | A1 * | 5/2020 | Leister | G02B 27/0081 |
| 2020/0249480 | A1 * | 8/2020 | Martinez | G02F 1/133528 |
| 2020/0341268 | A1 * | 10/2020 | Amirsolaimani | G02B 5/3083 |
| 2020/0348528 | A1 * | 11/2020 | Jamali | G02F 1/133536 |
| 2021/0080726 | A1 * | 3/2021 | Geng | G02B 27/106 |
| 2021/0084269 | A1 * | 3/2021 | Geng | G02B 6/0058 |
| 2021/0208397 | A1 * | 7/2021 | Lu | G02B 27/0179 |
| 2021/0223549 | A1 * | 7/2021 | Maimone | G02B 17/004 |
| 2021/0247611 | A1 | 8/2021 | Hudman | |
| 2021/0247612 | A1 | 8/2021 | Hudman | |
| 2021/0278679 | A1 * | 9/2021 | Ouderkirk | G02B 27/0172 |

* cited by examiner

COMPACT OPTICS FOR HEAD-MOUNTED DISPLAY SYSTEMS

BACKGROUND

Technical Field

The present disclosure generally relates to optical systems, and more particularly, to optical systems for use with head mounted display systems.

Description of the Related Art

Near-eye display technology may be used to present information and images to a user as part of a virtual reality ("VR"), augmented reality ("AR"), or mixed reality ("MR") system. Such a near-eye display may be incorporated into a head-mounted display ("HMD") device or headset. While these near-eye information displays can be oriented as direct-view, often the information displays are coupled with one or more lenses in the HMD. Lens systems may comprise lenses, various optical elements, aperture stops, and a lens housing to contain the various components in optical alignment with one another. Such lenses can enhance the VR or AR experience, but performance of lens systems depends, in part, on the design of each of the elements of the system as well as the overall design of the system, which sets forth the optical interaction among the elements.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
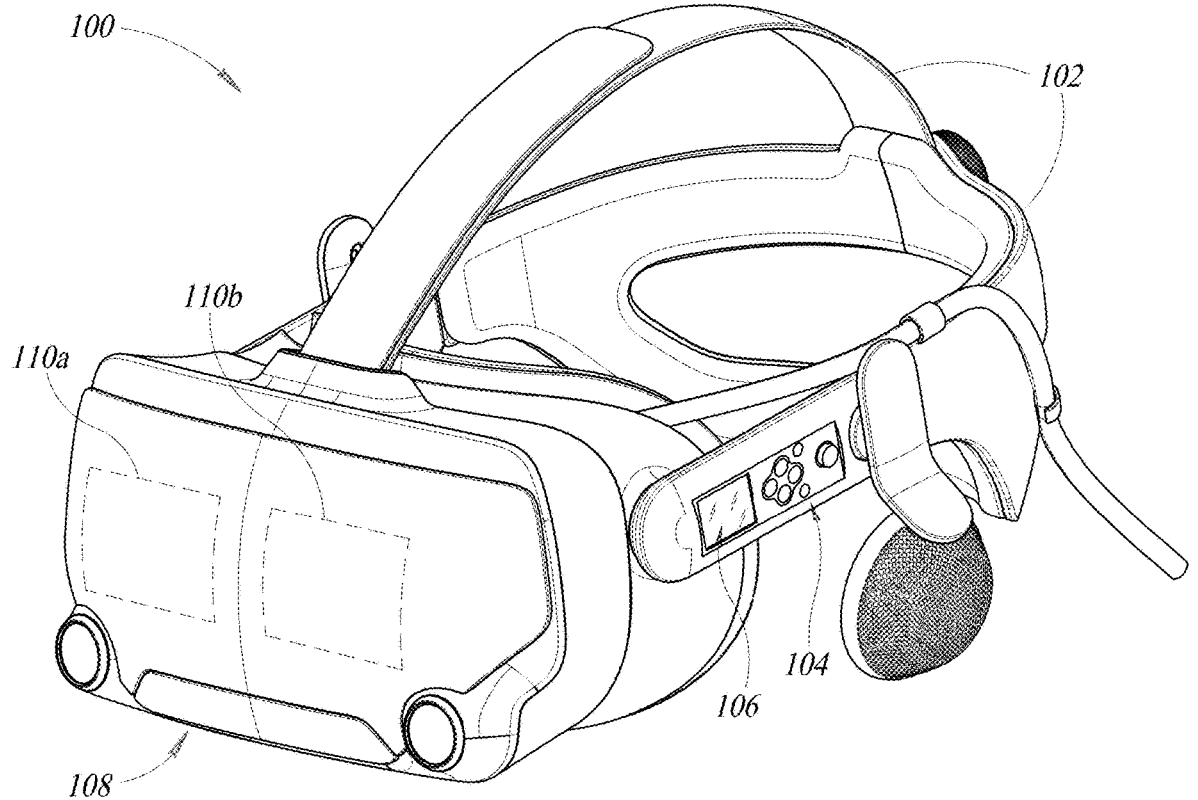
FIG. 1 is an illustration of a head-mounted display system, according to one non-limiting illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

In various examples described herein, techniques and architectures may be used to produce an image focused onto an eye (one or both) of a user of a HMD device. Examples of a HMD device may include a display device worn on a user's head or as part of a helmet, such as a head-mounted display ("HMD") device or headset, and may include position or motion sensors to measure inertial position or orientation of the HMD device. The display device may include a display in front of one eye, each eye, or both eyes. The display devices may include liquid crystal displays (LCDs), organic light-emitting diode (OLED), liquid crystal on silicon (LCoS), or cathode ray tubes (CRTs), just to name a few examples. A HMD device may display a computer-generated image, referred to as a virtual image. For example, a processor of the HMD device may render and display a synthetic (virtual) scene so that the viewer (wearer of the HMD device) perceives the scene as reality (or augmented reality), as described below.

In some examples, an LCD display device includes several components. Two of the components are the display matrix, which obstructs light in a granular or pixelated fashion to create an image, and a light source or backlight. The light source is typically positioned behind the display matrix and illuminates the image. For a color display, the backlight typically emits broad spectrum light, such as white light, for example.

Near-eye display technology may be used to present information and images to a user as part of a virtual reality ("VR") or augmented reality ("AR") system, which may be in the form of a HMD device, such as that introduced above. VR or AR HMDs may use one or more lenses to direct light associated with images displayed on one or more information displays (e.g., a pixelated LCD display device) to the user's eye(s). Among other things, lenses are used to bend light from the information display(s) so as to make the information display appear to the user to be farther away than it actually is. This provides the user a greater depth of field in the virtual environment and allows the user to more easily focus on the displayed image. Lenses also can be used in VR or AR headsets to increase the field of view of the information display for the user. A larger field of view can increase the immersive effect of the VR or AR system. Lenses can further be used in VR or AR headsets to shape the light from a single display so that the light received by the user is tailored separately for the user's left and right eyes. Use of separately tailored images for each eye can cause the user to perceive a stereoscopic or three-dimensional image, for example. Lenses are further designed in the near-eye environment with a constraint that the user's eyes are relatively close to the information display.

In at least some implementations of the present disclosure, conventional HMD lens may be replaced with one or more diffractive optical elements coupled to or positioned adjacent to a display system, wherein the one or more diffractive optical elements are part of a catadioptric optical system, also referred to as a "pancake" optical system or "folded" optical system, in which light is both reflected and refracted. An example catadioptric optical system of the present disclosure is based on polarization, as discussed further below.

FIG. 1 is a schematic diagram depicting a wearable HMD device 100 that is wearable on the head of a user. A computing device associated with the HMD device 100 may provide rendering data associated with individual virtual content items to HMD device 100 and cause the individual virtual content items to be presented on a display associated with the HMD device 100, such as displays 110a and 110b shown in dashed lines in FIG. 1. Rendering data may include instructions for rendering a graphical representation of a virtual content item via a display of the device. For example, the rendering data may include instructions describing the geometry, viewpoint, texture, lighting, shading, etc. associated with a virtual content item. In an illustrative example, the virtual content items may be presented on the display of the HMD device 100 as part of a game that the user can play using the HMD device 100.

In some examples, the computing device may be located remotely from HMD device 100 in a network, such as the Internet. In other embodiments, the computing device may be collocated with the HMD device 100 (e.g., embedded in the HMD device 100, coupled to the HMD device 100 via a wired or wireless connection). Moreover, HMD device 100 may be communicatively coupled to a network in any manner, such as by a global or local wired or wireless connection (e.g., local area network (LAN), intranet, Bluetooth, etc.). The network(s) may facilitate communication between the computing device(s) and the HMD device(s) 100 associated with one or more users.

In the illustrated embodiment, the HMD device 100 includes a set of straps 102 attached to a main body 108. The set of straps 102 are useable to selectively and securely mount the HMD device 100 to the head of the user for viewing visual content. The main body 108 may include a control panel 104 for controlling various aspects of the HMD device 100. Non-limiting examples of an electrical input device of the control panel 104 include a keypad having a set of keys for providing alphanumeric input or navigating a menu, or a dial or knob that is electrically coupled to the controller. The control panel 104 may include a display 106 for displaying information regarding the HMD device 100. In some embodiments, the display 106 may be a touchscreen input device that the user may interact with to control the HMD 100.

Figure 2:
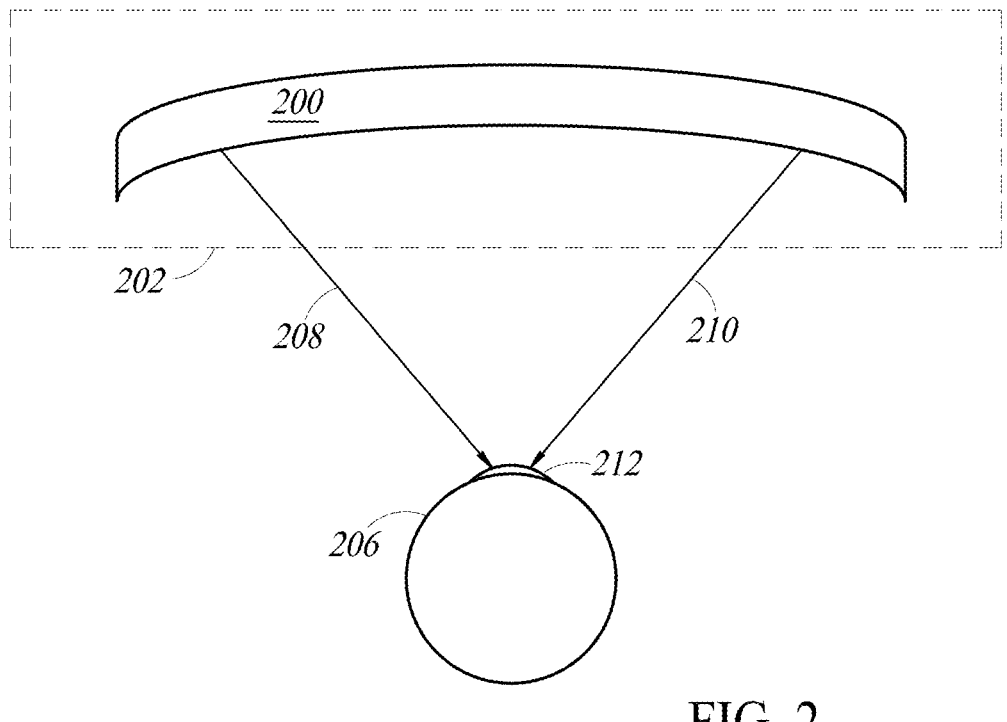
FIG. 2 is a schematic cross-section diagram of a portion of an example HMD system positioned relative to a user's eye, according to one non-limiting illustrated implementation.

FIG. 2 is a schematic cross-section diagram of a portion 202 of a HMD device 200 positioned relative to a user's eye 206. For example, the HMD device 200 may be the same as or similar to the HMD device 100 of FIG. 1. In certain embodiments, HMD device 200 may be configured to display an image to be seen by both the left and right eyes of the user. This can be achieved using separate left and right LCD displays, or can be achieved using a single LCD display. Similarly, the HMD device 200 (e.g., in the form of a VR or AR headset) may include a single lens assembly or optical system or it may use individual left and right lens assemblies or optical systems.

Example light rays 208 and 210 illustrate possible paths of light from the HMD device 200 to the cornea 212 of the user's eye 206. The cornea 212 may be treated as having a substantially spherical shape. The HMD device 200 may include a near-to-eye display so that paths of light rays 208 and 210 are relatively short, such as to provide an eye relief of about 15 millimeters, for example. In this case, optics of the HMD device 200 are configured to focus light onto a surface (e.g., cornea 212) that is relatively close to the HMD device. Such a configuration may involve a pancake optical system that has a relatively thin profile that enables the pancake optical system to fit into HMD device 200 while allowing for a physical clearance from the user's eye 206.

Figure 3:
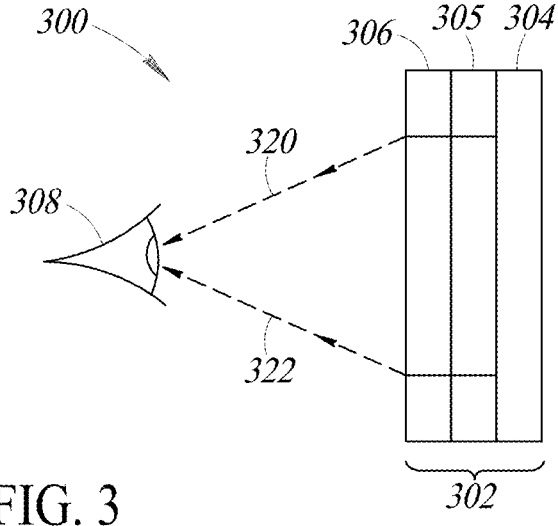
FIG. 3 is a schematic cross-section diagram of a system that includes a display system and optical subsystem, wherein the optical system includes a diffractive optical element coupled to a surface of the display system, according to one non-limiting illustrated implementation.

FIG. 3 is a schematic cross-section diagram of a system 300 that includes a display and optical subsystem, according to one or more embodiments. The system 300 may be incorporated in a head-mountable device, such as the HMD devices 100 or 200, for example. However, it is to be appreciated that the system 300 may be incorporated in other types of devices including, without limitation, cameras, binoculars, office equipment, scientific instruments, etc. The system 300 may include a pixelated display device 302, sometimes called an information display or display system and an optical subsystem 306, which may be incorporated into the display (e.g., laminated thereon, adhesively fixed thereto, positioned adjacent thereto). A schematic representation of an eye 308 of a user is also illustrated. Such elements are aligned along a horizontal optical axis of the system 300.

The display system 302 may include a pixelated display 304 and a circular polarizer 305 positioned in front of the pixelated display to provide circularly polarized light (e.g., right-handed, left handed). In other implementations, the display 304 may be configured to output light of different polarizations, such as vertically or horizontally polarized light. In some configurations, the display 304 may be configured to output color-specific polarized light, such as blue and green light that is polarized in a first polarization state and red light that is polarized in a second polarization state. The first polarization state may be orthogonal to the second polarization state (e.g., vertical polarization, horizontal polarization, etc.).

The display system 302 may include a backlight assembly, which emits light, which may include a light source, such as one or more light emitting diodes (LEDs), one or more OLEDs, one or more cold cathode fluorescent lamps (CCFLs), one or more lasers, one or more quantum dots, or any combination of these example light sources. The light source in the backlight assembly may emit light across a broad spectrum (e.g., white light) so that the display system 302 can produce color images across the visible spectrum. The backlight assembly may emit light uniformly across its entire front face over a range of about 160 to 180 degrees, for example.

The display system 302, in coordination with the backlight assembly, may emit light over a range of angles up to about 180 degrees (light that is just shy of parallel to the face of the backlight assembly). This range of emission angles is sometimes referred to as the backlight assembly's field of view or the backlight assembly's cone of light. In some embodiments, the display 304 of the display system 302 may be an LCD matrix that includes one or more polarizing layers, a liquid crystal layer, and a thin film transistor layer. The LCD matrix creates images by obscuring portions of the backlight in a pixelated fashion. An image is displayed when light is emitted from backlight assembly and passes through the display 304 (e.g., an LCD matrix) and through the circular polarizer 305 (or other polarizer(s) if present). The backlight assembly and the display may be separated from each other, or these two components may be sandwiched together with little, if any, space between them.

The optical subsystem 306 may include one or more diffractive optical elements to direct light 320, 322 from the display 302 toward the user's eye 308. The optical subsystem 306 may have a catadioptric or "pancake" configuration, for example, wherein light is reflected and refracted or "folded" to provide a very compact design. The optical subsystem 306 may include one or more of a reflective polarizer, a wave plate (e.g., quarter-wave plate), additional diffractive optical elements, etc. In this case, the optical subsystem 306 may include an assembly of optical elements configured to direct light from the display system 302 toward the user's eye 308 using on-axis optical folding based, at least in part, on polarization of the light, as described further below. In some embodiments, the optical system 306 may include multiple stacked diffractive optical elements that are each tuned to operate on a particular polarization of light and to pass light that is of a different polarization state (e.g., orthogonal). The optical subsystem 306 may be affixed to (e.g., adhesively bonded using an optically clear adhesive, such as a pressure-sensitive adhesive or PSA, laminated) the remainder of the display system 302.

As discussed further below, the optical subsystem 306 may include various other optical elements. For example, optical subsystem 306 may include at least one polarizing beam splitter, also referred to herein as a reflective polarizer. In at least some implementations, the reflective polarizer 338 may be adhesively bonded to an optically clear substrate (e.g., via a suitable optically clear adhesive, such as PSA). The reflective polarizer may be located between the diffractive optical element and an exit surface (or side) of the optical subsystem. The reflective polarizer may substantially transmit light having a first polarization state and substantially reflects light having a second polarization state orthogonal to the first polarization state. In at least some implementations, the reflective polarizer may represent a beam splitter that only lets linearly polarized light of a first orientation (e.g., horizontal) pass through it, thereby reflecting all other light that is not linearly polarized in the first orientation. The reflective polarizer may be considered a linear polarizer reflector, or a reflective linear polarizer. That is, the reflective polarizer may combine the functionality of a linear polarizer and a beam splitter into a single element in at least some implementations.

Figure 4A:
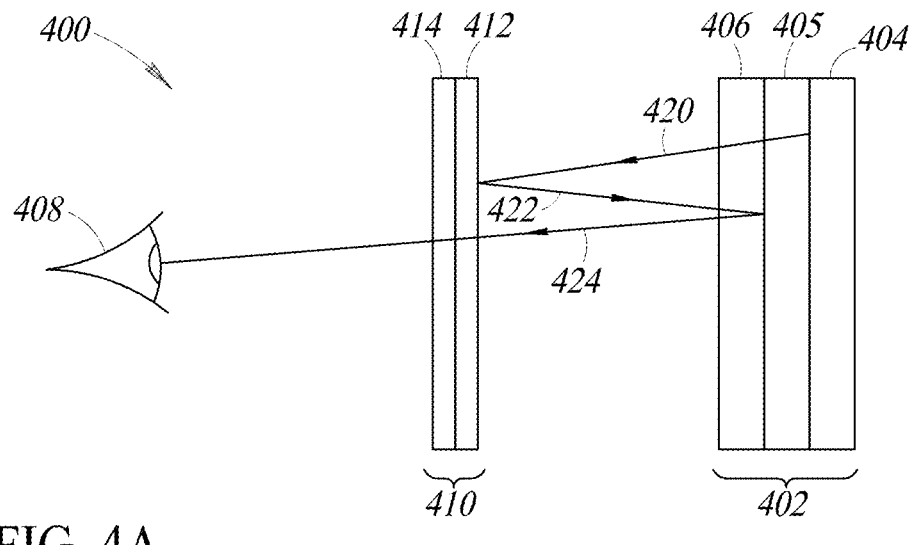
FIGS. 4A-4B are schematic cross-section diagrams of a system that includes a display system and optical subsystem, wherein the optical system includes a diffractive optical element coupled to a surface of the display system, and further includes a reflective polarizer and a quarter-wave plate, according to one non-limiting illustrated implementation.
Figure 4B:
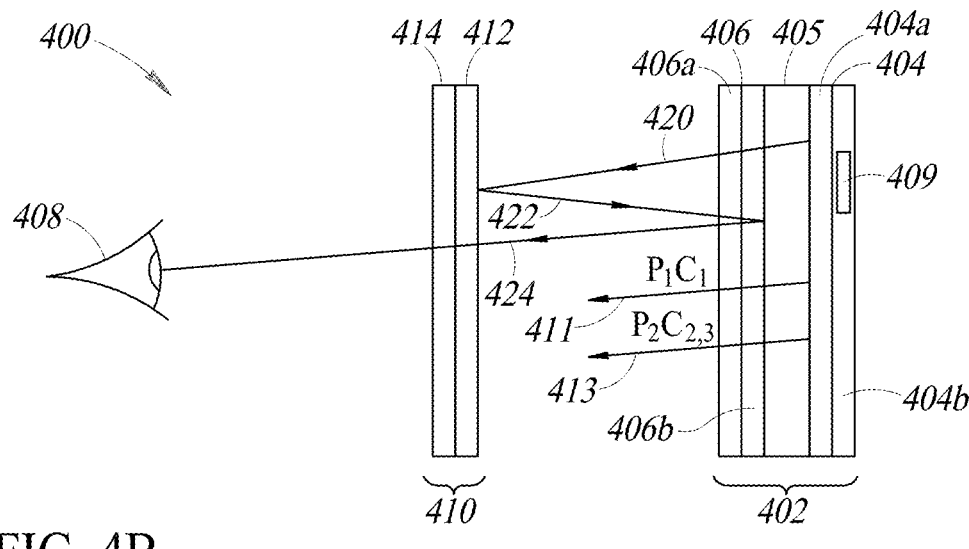

FIGS. 4A-4B are schematic cross-section diagrams of a system 400 that includes a display and optical subsystem, according to one or more embodiments. The system 400 may be incorporated in a head-mountable device, such as the HMD devices 100 or 200, for example. However, it is to be appreciated that the system 400 may be incorporated in other types of devices including, without limitation, cameras, binoculars, office equipment, scientific instruments, etc. Many of the components or features of the system 400 may be similar or identical to components of other systems described herein. Accordingly, the description of such other systems may also apply to the system 400. Further, one or more features or components of the system 400 may be combined with one or more features or components of other systems described herein, and vice versa, such that any combination of the systems of the present disclosure may be used to implement the techniques described herein.

The system 400 may include a pixelated display device or system 402, sometimes called an information display or display system, and an optical subsystem 406 and 410, which may be considered to be part of the display system or a separate component of the system 400. A schematic representation of an eye 408 of a user is also illustrated. Such elements are aligned along a horizontal optical axis.

The display system 402 may include a pixelated display 404 and a polarizer 405 (e.g., circular polarizer) positioned in front of the pixelated display to provide circularly polarized light. The display system 402 may include a backlight assembly which emits light, may include a light source, such as one or more light emitting diodes (LEDs), one or more OLEDs, one or more cold cathode fluorescent lamps (CCFLs), one or more lasers, one or more quantum dots, or any combination of these example light sources. The light source in the backlight assembly may emit light across a broad spectrum (e.g., white light) so that the display system 402 can produce color images across the visible spectrum. The backlight assembly may emit light uniformly across its entire front face over a range of about 160 to 180 degrees, for example.

The display system 402, in coordination with the backlight assembly, may emit light over a range of angles up to about 180 degrees (light that is just shy of parallel to the face of the backlight assembly). This range of emission angles is sometimes referred to as the backlight assembly's field of view or the backlight assembly's cone of light. In some embodiments, the display 404 of the display system 402 may be an LCD matrix that includes one or more polarizing layers, a liquid crystal layer, and a thin film transistor layer. The LCD matrix creates images by obscuring portions of the backlight in a pixelated fashion. An image is displayed when light is emitted from backlight assembly and passes through the display 404 (e.g., an LCD matrix) and through the circular polarizer 405. The backlight assembly (e.g., backlight assembly 404b shown in FIG. 4B) and the display portion (e.g., display 404a) of the display 404 may be separated from each other, or these two components may be sandwiched together with little, if any, space between them.

The optical subsystem 406 and 410 may include one or more diffractive optical elements 406 positioned on the display system (e.g., over the polarizer 405) to direct light 420, 422, 424 from the display system 402 toward the user's eye 408. The optical subsystem may have a pancake configuration, as discussed above. The optical subsystem may further include a quarter-wave plate 412 and a reflective polarizer 414. In this case, the optical subsystem may include an assembly of optical elements configured to direct light from the display system 402 toward the user's eye 408 using on-axis optical folding based, at least in part, on polarization of the light, as described further below. In some embodiments, such as the embodiment shown in FIG. 4B, the diffractive optical element 406 of the optical system includes a first diffractive optical element 406a and a second diffractive optical element 406b stacked together. The components may be affixed to each other (e.g., adhesively bonded using an optically clear adhesive, laminated) or spaced apart from each other.

In at least some implementations, the reflective polarizer 414 may be adhesively bonded to an optically clear substrate (e.g., via a suitable optically clear adhesive), and the quarter-wave plate 412 may be bonded to the reflective polarizer. The reflective polarizer 414 may substantially transmit light 411 (FIG. 4B) having a first polarization state (P$_1$) and substantially reflects light 413 having a second polarization state (P$_2$) orthogonal to the first polarization state. In at least some implementations, the reflective polarizer 414 may represent a beam splitter that only lets linearly polarized light of a first orientation (e.g., horizontal) pass through it, thereby reflecting all other light that is not linearly polarized in the first orientation. The reflective polarizer 414 may be considered a linear polarizer reflector, or a reflective linear polarizer. That is, the reflective polarizer 414 may combine the functionality of a linear polarizer and a beam splitter into a single element in at least some implementations.

FIGS. 4A-4B show a folded optical path 420, 422, 424 of the optical system, in accordance with one or more embodiments. In some embodiments, one or more of the optical elements may have one or more coatings or layers, such as anti-reflective coatings, enhance contrast coatings, reflective or partially reflect coatings, as discussed above. For example, there may be a partial reflector between the diffractive optical element 406 and the circular polarizer 405 to provide a catadioptric optical system, as discussed elsewhere herein.

Figure 5:
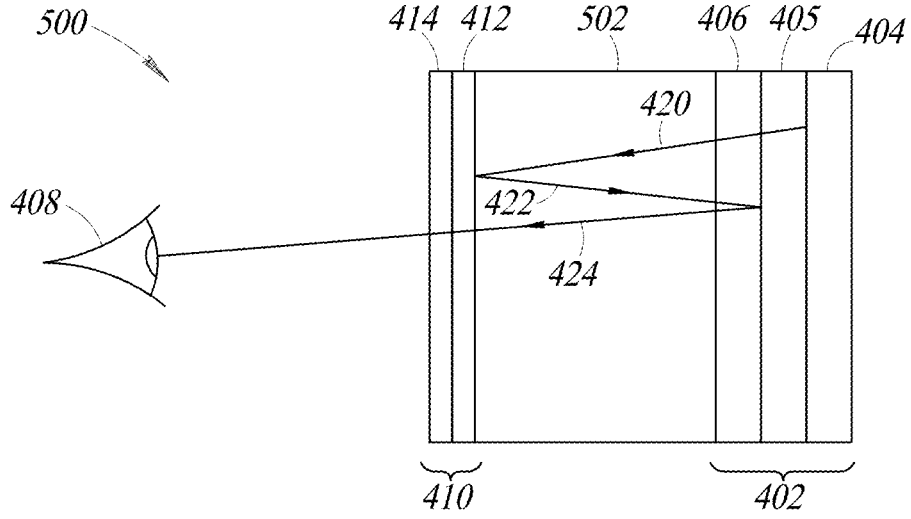
FIG. 5 is a schematic cross-section diagram of a system that includes a display system and optical subsystem, wherein the optical system includes a diffractive optical element coupled to a surface of the display system, and further includes a reflective polarizer, a quarter-wave plate, and an optically clear component positioned between the quarter-wave plate and the diffractive optical element, according to one non-limiting illustrated implementation.

FIG. 5 is a schematic cross-section diagram of a system 500 that includes a display and optical subsystem, according to one or more embodiments. The system 500 may be incorporated in a head-mountable device, such as the HMD devices 100 or 200, for example. However, it is to be appreciated that the system 500 may be incorporated in other types of devices including, without limitation, cameras, binoculars, office equipment, scientific instruments, etc. Many of the components or features of the system 500 may be similar or identical to components of other systems described herein. Accordingly, the description of such other systems may also apply to the system 500. Further, one or more features or components of the system 500 may be combined with one or more features or components of other systems described herein, and vice versa, such that any combination of the systems of the present disclosure may be used to implement the techniques described herein.

The system 500 may be substantially similar to the system 400 described above, but may also include an optically clear layer 502 coupled (e.g., adhesively coupled) between the diffractive optical element 406 and the quarter-wave plate 412. The optically clear layer or component 502 may be formed from glass, plastic, or any other suitable material.

Figure 6:
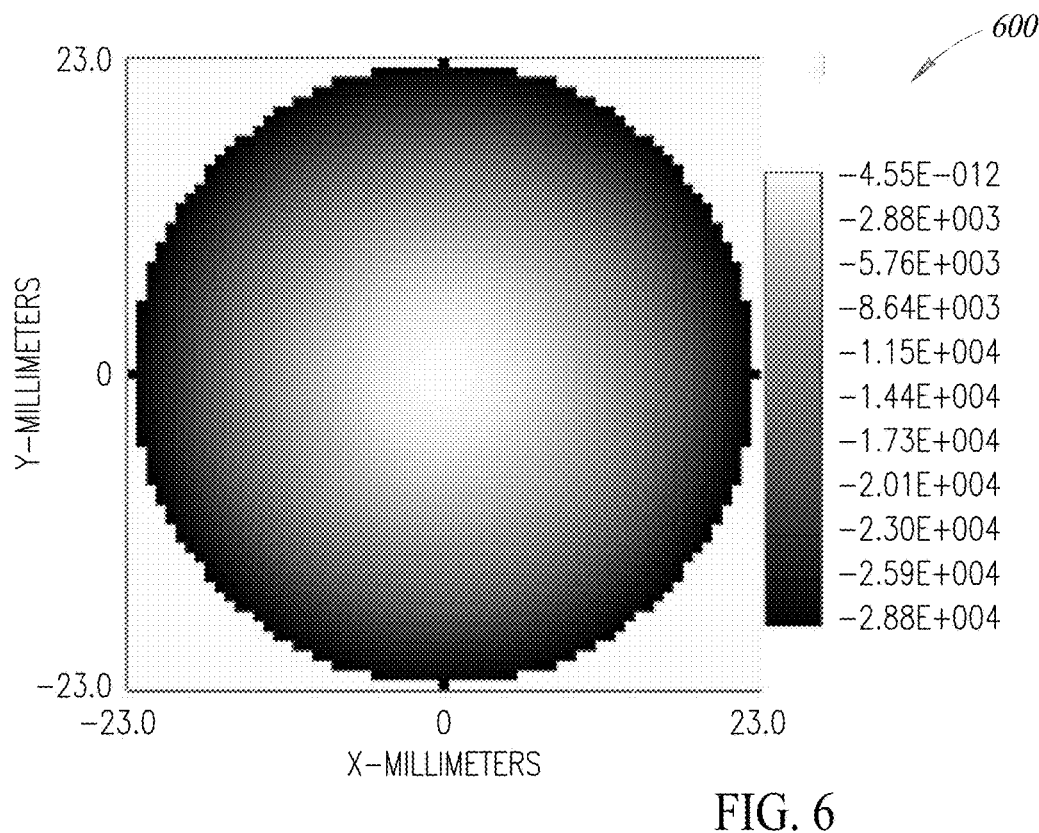
FIG. 6 is a surface phase map showing the phase profile of an example diffractive optical element, according to one non-limiting illustrated implementation.
Figure 7:
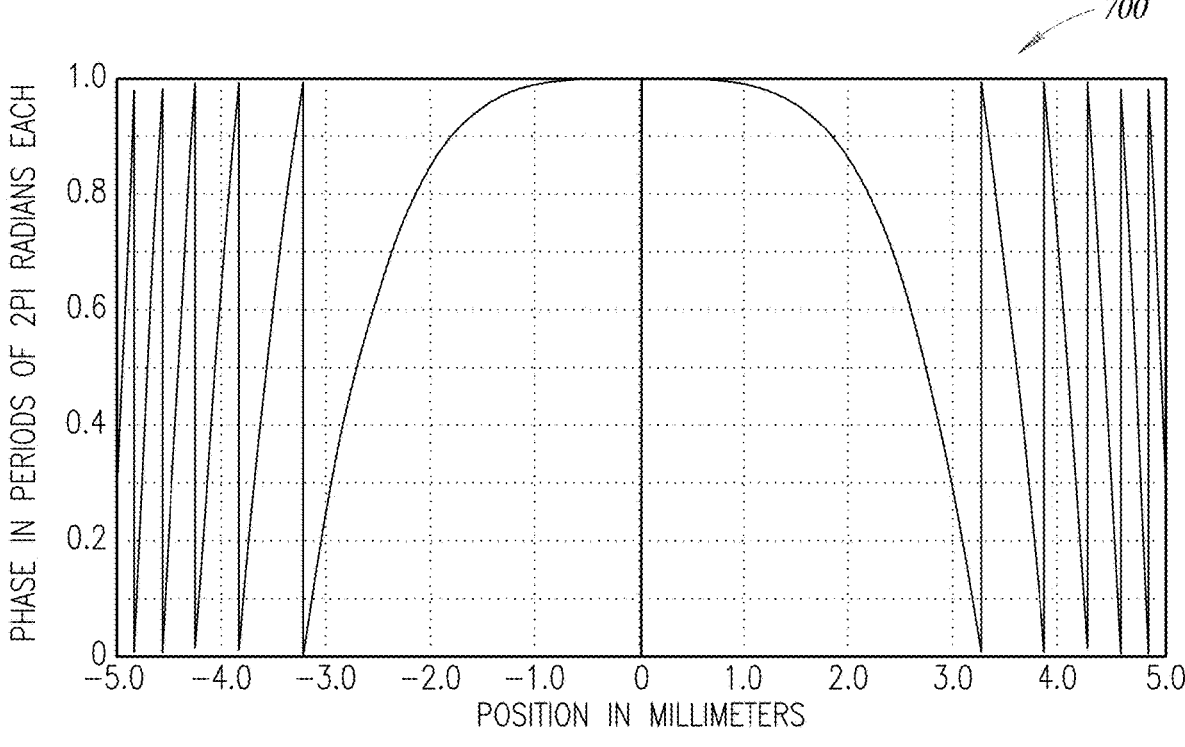
FIG. 7 is a plot showing the cross section of phase of the diffractive optical element of FIG. 6 along a horizontal ("x") axis, according to one non-limiting illustrated implementation.

FIG. 6 is a surface phase map 600 showing the phase profile of an example diffractive optical element having a width and height of 46 millimeters, according to one non-limiting illustrated implementation. The phases are displayed in modulo-2π. FIG. 7 is a plot 700 showing the cross section of phase of the diffractive optical element of FIG. 6 along a horizontal ("x") axis that extends between −5.0 mm to +5.0 mm, according to one non-limiting illustrated implementation.

The diffractive optical elements discussed herein may include one or more of any types of diffractive optical elements including, but not limited to, multi-twist retarders, wave plates (e.g., quarter-wave plates, half-wave plates) surface reliefs, metalenses, achromatic diffractive lenses (ADLs), polarization-based diffractive optical elements, etc.

Further as discussed above, the diffractive optical element may include a first diffractive optical element and a second diffractive optical element, the first diffractive optical element being operative to diffract light of a first polarization state and to pass light of a second polarization state, and the second diffractive optical element being operative to diffract light of the second polarization state and to pass light of the first polarization state. In at least some implementations, the first diffractive optical element 406a is optimized to diffract light of a first color (e.g., red light or C$_1$ in FIG. 4B), which has a first polarization state (P$_1$), and the second diffractive optical element 406B is optimized to diffract light 413 of a second color C$_2$ and a third color C$_3$ (e.g., blue and green), which has a second polarization state orthogonal to the first polarization state. Thus, multiple (e.g., two) diffractive optical elements may be used to provided optimized diffraction for specific colors, based on polarization, such that the overall chromatic aberration of the optical system is significantly reduced.

In at least some implementations, the display system provides light to the optical system, wherein the light comprising light of a first color that is in one of the first polarization state and the second polarization state, and light of a second color and a third color that is in the other of the first polarization state and the second polarization state.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A head-mounted display system operative to present images to an eye of a user, the head-mounted display system comprising:

a support structure configured to be worn on the head of the user;

a single pixelated display system including red, green, and blue sub-pixels, supported by the support structure, the display system configured to emit image light comprising (i) red light polarized in a first polarization state and (ii) blue and green light polarized in a second polarization state orthogonal to the first polarization state; and an optical system comprising a catadioptric optical system that includes:

a diffractive optical element positioned on the display system on a surface that faces the user's eye during operation, the diffractive optical element comprising:

a first diffractive sub-element configured to diffract the red light in the first polarization state while transmitting light in the second polarization state; and a second diffractive sub-element configured to diffract the blue and green light in the second polarization state while transmitting light in the first polarization state;

wherein the diffractive optical element is configured to focus light from the display system to the user's eye;

a reflective polarizer positioned between the diffractive optical element and the user's eye; and a quarter-wave plate positioned between the diffractive optical element and the reflective polarizer.

2. The head-mounted display system of claim 1, wherein the diffractive optical element comprises a surface relief or a polarization-based diffractive optical element.

3. The head-mounted display system of claim 1, wherein the diffractive optical element comprises an achromatic diffractive lens (ADL).

4. The head-mounted display system of claim 1, wherein the display system comprises a backlight that includes a coherent light source.

5. The head-mounted display system of claim 1, wherein the diffractive optical element comprises a metalens.

6. The head-mounted display system of claim 1, wherein the optical system comprises a film laminated to the display system.

7. The head-mounted display system of claim 1, wherein the optical system includes a substrate coupled to the display system.

8. The head-mounted display system of claim 1, further comprising an optically clear substrate positioned between the diffractive optical element and the quarter-wave plate.

9. The head-mounted display system of claim 8 wherein the optically clear substrate comprises plastic or glass.

10. A near-eye display system, comprising:

a display subsystem comprising a single array of red, green, and blue pixels configured to emit light comprising (i) red light polarized in a first polarization state and (ii) blue and green light polarized in a second polarization state orthogonal to the first polarization state; and an optical system comprising a catadioptric optical system that includes:

a diffractive optical element positioned on the display system on a surface that faces a user's eye during operation, the diffractive optical element comprising:

a first diffractive sub-element configured to diffract the red light in the first polarization state while transmitting light in the second polarization state; and a second diffractive sub-element configured to diffract the blue and green light in the second polarization state while transmitting light in the first polarization state;

wherein the diffractive optical element is configured to focus light from the display system to the user's eye;

a reflective polarizer positioned between the diffractive optical element and the user's eye; and a quarter-wave plate positioned between the diffractive optical element and the reflective polarizer.

11. The near-eye display system of claim 10, wherein the diffractive optical element comprises a surface relief or a polarization-based diffractive optical element.

12. The near-eye display system of claim 10, wherein the diffractive optical element comprises an achromatic diffractive lens (ADL).

13. The near-eye display system of claim 10, wherein the display system comprises a backlight that includes a coherent light source.

14. The near-eye display system of claim 10, wherein the diffractive optical element comprises a metalens.

15. The near-eye display system of claim 10, wherein the optical system comprises a film laminated to the display system.

16. The near-eye display system of claim 10, wherein the optical system includes a substrate coupled to the display system.

17. The near-eye display system of claim 10, further comprising an optically clear substrate positioned between the diffractive optical element and the quarter-wave plate.

18. The near-eye display system of claim 17 wherein the optically clear substrate comprises plastic or glass.

19. A head-mounted display system operative to present images to an eye of a user, the head-mounted display system comprising:

a support structure configured to be worn on the head of the user;

a single pixelated display system including red, green, and blue sub-pixels, supported by the support structure, the display system configured to emit image light comprising (i) red light polarized in a first polarization state and (ii) blue and green light polarized in a second polarization state orthogonal to the first polarization state; and an optical system comprising a catadioptric optical system that includes:

a diffractive optical element positioned on the display system on a surface that faces the user's eye during operation, the diffractive optical element comprising:

a first diffractive sub-element configured to diffract the red light in the first polarization state while transmitting light in the second polarization state; and a second diffractive sub-element configured to diffract the blue and green light in the second polarization state while transmitting light in the first polarization state, wherein the diffractive optical element is configured to focus light from the display system to the user's eye;

a reflective polarizer positioned between the diffractive optical element and the user's eye; and a quarter-wave plate positioned between the diffractive optical element and the reflective polarizer.

* * * * *